United States Patent
Mazzarella et al.

(10) Patent No.: US 9,615,218 B2
(45) Date of Patent: Apr. 4, 2017

(54) INTELLIGENT FORMATION AND MANAGEMENT OF DYNAMIC TALK GROUPS

(71) Applicant: MUTUALINK, INC., Wallingford, CT (US)

(72) Inventors: Joseph R. Mazzarella, Tolland, CT (US); Michael S. Wengrovitz, Concord, MA (US)

(73) Assignee: Mutualink, Inc., Wallingford, CT (US)

( * ) Notice: Subject to any disclaimer, the term of this patent is extended or adjusted under 35 U.S.C. 154(b) by 0 days.

(21) Appl. No.: 14/609,815

(22) Filed: Jan. 30, 2015

(65) Prior Publication Data

US 2016/0227384 A1 Aug. 4, 2016

(51) Int. Cl.
*H04W 4/10* (2009.01)
*H04W 4/02* (2009.01)
*H04W 4/08* (2009.01)
*H04W 12/08* (2009.01)
*H04W 4/22* (2009.01)
*H04W 76/00* (2009.01)

(52) U.S. Cl.
CPC ............ *H04W 4/10* (2013.01); *H04W 4/021* (2013.01); *H04W 4/08* (2013.01); *H04W 12/08* (2013.01); *H04W 4/023* (2013.01); *H04W 4/22* (2013.01); *H04W 76/005* (2013.01)

(58) Field of Classification Search
CPC ..... H04W 4/22; H04W 76/007; H04W 12/08; H04W 4/08; H04W 4/10; H04W 76/005; H04W 4/021; H04W 4/023
See application file for complete search history.

(56) References Cited

U.S. PATENT DOCUMENTS

| | | | |
|---|---|---|---|
| 7,643,445 B2 | 1/2010 | Mills et al. | |
| 8,320,874 B2 | 11/2012 | Mills et al. | |
| 8,364,153 B2 | 1/2013 | Boucher et al. | |
| 8,538,383 B2 | 9/2013 | Beyer, Jr. et al. | |
| 8,811,940 B2 | 8/2014 | Boucher et al. | |
| 2004/0192353 A1* | 9/2004 | Mason | G01S 5/0027 455/457 |
| 2007/0287474 A1 | 12/2007 | Jenkins et al. | |

(Continued)

OTHER PUBLICATIONS

International Search Report and Written Opinion for PCT Application No. PCT/US2016/015602, 12 pages, mailed Apr. 25, 2016.

*Primary Examiner* — Devan Sandiford

(74) *Attorney, Agent, or Firm* — Sterne, Kessler, Goldstein & Fox P.L.L.C.

(57) ABSTRACT

Embodiments include a system, method, and computer program product that enable intelligent formation and management of dynamic talk groups. Embodiments include a discretionary sharing mechanism based on invitation and acceptance that allows for dynamic publication or sharing of information in real time among agencies responding to an incident, where the agencies may establish secure communications. Additional embodiments include establishing and associating geographic boundaries of incident sites with talk groups, monitoring conditions that trigger warning messages sent to talk group members, and subscriptions to information channels that allow multimedia information to flow into talk groups.

20 Claims, 5 Drawing Sheets

(56) References Cited

U.S. PATENT DOCUMENTS

| | | | | |
|---|---|---|---|---|
| 2010/0150122 A1* | 6/2010 | Berger | ................... | H04W 4/02 |
| | | | | 370/338 |
| 2013/0198517 A1 | 8/2013 | Mazzarella | | |
| 2013/0331139 A1 | 12/2013 | Mills et al. | | |
| 2014/0349698 A1* | 11/2014 | Burks | ................ | H04W 52/383 |
| | | | | 455/518 |
| 2015/0081579 A1* | 3/2015 | Brown | ................ | G06Q 50/265 |
| | | | | 705/325 |
| 2015/0195676 A1* | 7/2015 | Endress | ................ | H04W 4/02 |
| | | | | 455/404.2 |
| 2015/0281927 A1* | 10/2015 | Fiedler | ................... | H04W 4/22 |
| | | | | 455/404.2 |

* cited by examiner

INTELLIGENT FORMATION AND MANAGEMENT OF DYNAMIC TALK GROUPS

BACKGROUND

Field

The embodiments generally relate to electronic communications between secure communities, and more particularly, to providing intelligent formation and management of dynamic talk groups for push to talk (PTT) service among secure communities, including incident communications networks.

Background

Presently, a plethora of disparate communications resources exist including resources using private wireless communications (e.g., public safety and first responder communications networks), public switched network communications resources, public wireless networks, networks of video surveillance devices, private security networks, and the like. Additionally, millions of consumers and public officials are now equipped with smartphone devices that include multiple communications abilities including both voice and video communications.

Often these communications resources cannot communicate with each other. For example, private wireless communication networks, such as those used by public safety or commercial users, are typically isolated from one another and often utilize different and incompatible technologies. While interoperability products are available to interconnect such diverse systems, cooperation among the entities involved is often a barrier to full and scalable implementation. Thus, prior art first responder communication systems exist (e.g., silo-ed communications systems) wherein control of the resources of each organization coupled to the system is controlled by a central commander or controller. Each organization providing resources to the system must relinquish control of its resources to the central commander. The organization responsible for the operation of its radio system(s) may be unable or unwilling to grant control of its resources either to peer organizations or to a higher-level organization.

U.S. Pat. No. 7,643,445, entitled Interoperable Communications System and Method of Use, issued on Jan. 5, 2010, and U.S. Pat. No. 8,320,874, entitled System and Method for Establishing an Incident Communications Network, issued on Nov. 27, 2012, both of which are incorporated by reference in their entirety, describe systems and methods for providing an interoperable communications system ("interop system," also referred to as an Incident Communications Network) including a plurality of otherwise disjunct or disparate communications systems that addressed the deficiencies of prior art systems. The '445 and '874 patents specifically describe methods for establishing an incident communications network that enables interoperable communications among communications resources controlled by multiple organizations during an incident involving emergency or pre-planned multi-organization communications wherein a communications resource is controlled by an administrator within an organization.

Additionally, U.S. Pat. No. 8,364,153, entitled Mobile Interoperability Workstation Controller Having Video Capabilities within an Incident Communications Network, issued on Jan. 29, 2013, ("Mobile IWC Application") which is also incorporated herein by reference in its entirety, extends the concepts of the '445 and '874 patents. Namely, the Mobile IWC Application includes enhanced video capture and streaming capabilities that are integrated with incident information and events to facilitate improved management and analysis of incidents or events in which an incident communications network is employed.

Additionally, U.S. Pat. No. 8,811,940, entitled Dynamic Asset Marshalling Within an Incident Communications Network, issued on Aug. 19, 2014, ("Marshalling Application") which is also incorporated herein by reference in its entirety, extends the concepts of the '445 and '874 patents. Namely, the Marshalling Application provides systems and methods that marshal resources into an incident communications network based on a variety of factors, such as the type of incident and the type of resource being marshaled.

U.S. Patent Publication 2013/0198517, entitled Enabling Ad Hoc Trusted Connections Among Enclaved Communication Communities, filed on Mar. 13, 2013, ("Enclaved Application") which is also incorporated herein by reference in its entirety, extends the concepts of the '445 and '874 patents. Namely, the Enclave Application presents systems and methods for dynamic access among secure communities, such as incident communications networks, that enables communication resources of a first secure community to securely access and/or utilize communication resources within other secure communities.

Inadequate Push to Talk (PTT) Services

When an emergency occurs requiring multiple public safety agencies to respond, a joint incident command structure may be established where designated commanders from each agency coordinate activities of responding personnel. These scenarios are often chaotic and the impacted areas usually have personnel from many agencies present on site. It is often a complex, manual, and time consuming process to issue credentials to personnel, to manage their check-in for duty, and to keep track of who is on site. Further, when an incident response requires a specific skill-set, expertise, and/or knowledge of how a specific type of equipment operates, determining and identifying the requisite personnel having the necessary skills and/or equipment can be time consuming, and can require complex and multiple communication messages being relayed between agencies.

In addition, disaster areas often have various levels of restricted or limited access areas for personnel, due to environmental hazards or for facilitating ease of movement of personnel and equipment or the performance of certain unimpeded operational tasks. Communicating restricted access information, including the description of geographic boundaries, communicating access credential levels, and interrogating the validity of access credentials with respect to various personnel can be a complex, cumbersome and time-consuming process, thereby also potentially contributing to time-delays and negative impact on life safety and overall incident response.

Typical Push to Talk (PTT) services support the exchange voice communications using half-duplex communication methods, e.g., a two-way radio. A PTT talk group is a logically defined voice communications group defined by a PTT user or PTT administrator that allows users to send and receive voice messages from other member users in the talk group. In conventional PTT systems, such as land mobile radio systems, only one member of a group can transmit and speak at a time, and the remaining members listen. When the transmit channel is released, other members may push to talk (e.g., key a radio) and seize control of the transmitting function until the transmit function is released. The transmit control function may be accomplished through control signaling which blocks other PPT users from acquiring control of the shared transmit function, or may be accomplished through other means such a voice activated detection (VAD) coupled with in-band or out of band control signaling which blocks transmission by other users while a voice communication is being transmitted. Internet protocol systems using Voice over IP (VOIP) and other digital voice transmission over data network technologies enable client software operated on computing devices such as mobile smartphones to simulate PTT type functionality among a group of users. This IP based PTT technology enables users with a defined talk group to transmit and receive voice communications on a persistent basis subject to a user's PTT application client being actively run and being in active state such as being in the application foreground of an operating system. IP PTT may employ half duplex or full duplex communications, and may impose floor control using means similar to radio-based PTT systems. In either radio or IP based PTT systems, a central administrator function serves to register and administer members of a talk group and a talk group is typically limited to enterprise use (members within the same agency or enterprise) or user-defined where an authorized user may establish a talk group and invite members via the central administrator.

Embodiments address, among other things, the problem that conventional PTT services are inadequate because the published information about potential talk group members in different agencies is static and includes limited information such as a name, job title, and an associated agency. As a result, talk groups may be large and cumbersome and include a generalized membership which makes it difficult to address specific needs during an incident. Alternatively, the talk groups may be smaller and include and rely upon a dispatch unit from each of the responding agencies to relay communications to respective agency members. Both alternatives are complex and time-consuming. In addition, conventional PTT services do not consider geographic boundaries.

BRIEF SUMMARY OF THE INVENTION

What is needed is a system, method, and computer program product that enable intelligent formation and management of dynamic talk groups. Embodiments include a discretionary sharing mechanism based on invitation and acceptance that allows for dynamic publication or sharing of information in real time among agencies responding to an incident, where the agencies may establish secure communications. Embodiments also include establishing and associating geographic boundaries of incident sites with talk groups, monitoring conditions that trigger warning messages sent to talk group members, and managing subscriptions to information channels that allow multimedia information to flow into talk groups.

Embodiments include a system, method, and computer medium storage for intelligent formation and management of dynamic push to talk (PTT) talk groups among members of two or more agencies associated with an incident, where the two or more agencies communicate securely, and where an agency includes a collection of communication resources having an administrator that maintains control over each such agency. Embodiments include creating an incident control area associated with a geographic demarcation of the incident area, and electronically transmitting information about the incident control area to the two or more agencies. A talk group permission rule associated with the incident control area is established for automatically creating an invitation to join a PTT geotalk group. A joint invitation is electronically transmitted to the two or more agencies for access to PTT mobile unit users that meet criteria, where the joint invitation includes a request for location information. An acceptance to the joint invitation is electronically received that includes a User Identity and Credentials of a first PTT mobile unit user, where a dynamic access permission managed by the first agency determines what information associated with the User Identity and Credentials of the first PTT mobile unit user are available, and where the dynamic access permission changes in real time.

Further embodiments include obtaining a location of the first PTT mobile unit user in real time, where the obtaining is based on the dynamic access permission. When the first PTT mobile unit user is in proximity to the incident control area or is present in the incident control area, embodiments include determining whether the first PTT mobile unit user is authorized to enter the incident control area based on the dynamic access permission, and when the first PTT mobile unit user is authorized to enter the incident control area and the talk group permission rule is satisfied, the invitation to join the geotalk group is sent to the first PTT mobile unit user.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Overview

When an incident occurs, an incident communications network and/or secure communications may be established among two or more agencies responding to an incident. Each agency may have a push to talk (PTT) administrator that creates and manages PTT user data, and each agency publishes information about their PTT users. The information published typically includes static and limited information. PTT administrators may create an inter-agency PTT talk group based on the published information. But, the inter-agency PTT talk group may be monolithic, and responding agencies typically experience time delays as they engage in complex coordination and relaying of multiple communications to issue credentials to responding agency personnel, manage their check-in for duty, and track the personnel on the incident site. The situation becomes even more difficult to determine and identify responding personnel having particular skills and/or equipment, let alone communicate geographic boundaries associated with the incident.

In an embodiment, two or more agencies may establish secure communications, support push to talk services among their members, and respond to an incident. Each agency creates and stores a User Identity and Credentials that includes a unique identity for each PTT user in an agency host directory. Each User Identity and Credentials is associated with dynamic access permissions that determine what subset of information, or all information of a User Identity and Credentials are published and made visible to or discoverable by the other agencies. A joint agency application server is a multi-agency node that is a peer to each agency (e.g., not a central command control) that can invite one or more agencies to make more information visible (e.g., may request a change to a dynamic access permission). Each agency is in logical and physical control of their resources and information, and may choose to accept, partially accept, or decline the invitation. When an agency accepts the invitation, the agency can manually or automatically change a dynamic access permission to increase the level of detail about their PTT mobile unit users (e.g., Emergency Medical Services certifications) that is made visible to the other agencies, or provide some of the information requested. The ability to dynamically change the information visible to agencies and joint agency servers responding to an incident allows agencies to quickly and automatically create and manage talk groups tailored to perform specific tasks. In addition, agencies (including via a joint agency server) may create and associate geographic boundaries of an incident site called an incident control area. Members of a talk group may also subscribe to information channels to electronically receive multimedia data or warning messages.

System

Figure 1:
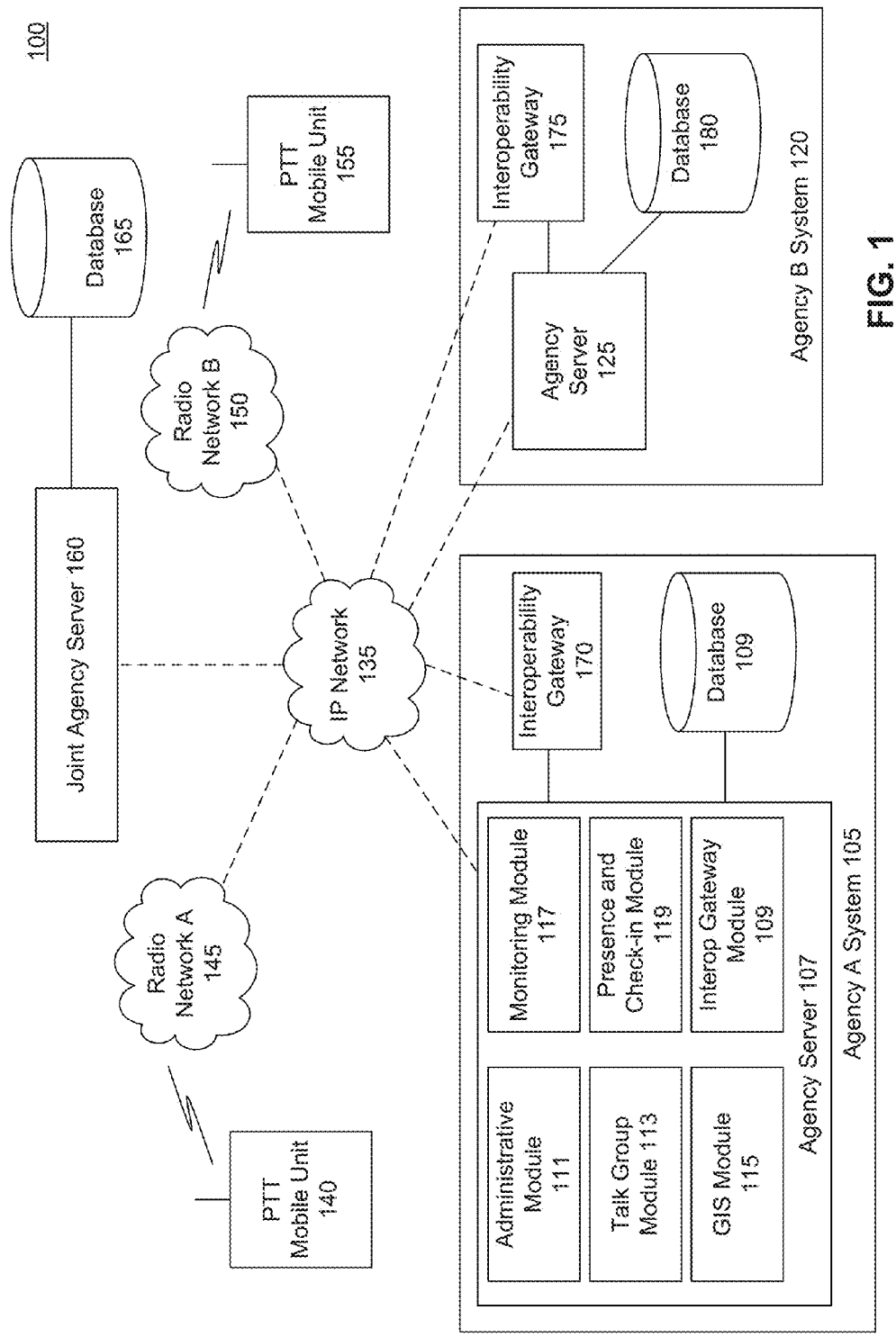
FIG. 1 is a block diagram of a system for intelligently forming and managing dynamic talk groups according to an embodiment of the invention.

FIG. 1 is a block diagram of a system 100 for intelligently forming and managing dynamic PTT talk groups according to an embodiment of the invention. For ease of discussion and without limitation, FIG. 1 will be described with reference to elements from FIG. 4. FIG. 1 illustrates two secure communities, Agency A System 105 and Agency B System 120, that have established secure communications over a network such as IP Network 135 as described in the Enclaved Application. A secure community or agency includes a collection of communication resources having an administrator that maintains control over the agency. Agency A and agency B support PTT services among members of the agencies responding to an incident.

Each agency includes an agency PTT application server that connects, routes, and exchanges voice and data messages among PTT application clients on computing devices whose users are members of a talk group. A PTT application is a two-way push to talk voice communication and data communications sharing application. The PTT application enables the transmission and receipt of real time voice communications, video streams, files, text, and other data between and among PTT users who are members of a talk group. A talk group is a logically defined communications group comprised of PTT users that are invited to join, and accept the invitation to join the talk group. For example, if a PTT administrator of agency A (not shown) and a user associated with PTT mobile unit 140 are members of a talk group, agency server 107 connects, routes, and exchanges voice and data messages between them via IP network 135 and radio network A 145. Likewise, agency B system 120 includes agency server 125 that supports PTT communications with a client PTT application on PTT mobile unit 155 over IP network 135 and radio network B150. In addition to a user associated with a PTT mobile unit, a PTT user may include an agency dispatch unit (not shown) using a computing device with a PTT application, and/or a PTT administrator (not shown) using a PTT application on a server.

A talk group may include members from one or more agencies as well as members of different networks such as the public switched telephone network, other land mobile radio networks, mobile telephone networks, and private multimedia broadband networks. An agency server (e.g., agency server 107) directly receives and transmits PTT messages from talk group members that are associated with the same agency (e.g., agency A). The agency server (e.g., agency server 107) receives and transmits PTT messages from the remaining talk group members that are not associated with the same agency (e.g., not associated with agency A) via an interoperability gateway (e.g., interoperability gateway 170). Likewise, agency B includes interoperability gateway 175 that has equivalent functions of interoperability gateway 170.

Databases 109, 180, and 165 may be any type of structured data store, including a relational database that stores information associated with a respective agency or joint agency operation (e.g., joint agency server 160).

Agency A system 105, agency B system 120, and joint agency server 160 include a variety of network interfaces, that may include an Ethernet interface, as well as wireless or wireline network interfaces that support a variety of networking protocols.

A PTT mobile unit (e.g., PTT mobile unit 140/155) may be a mobile computing device (e.g., a smart phone, a tablet, a personal digital assistant (PDA), or a laptop computer) that includes a client PTT application. In an embodiment, a PTT user may interface with PTT mobile unit 140/155 through a client PTT application. In an embodiment, a client PTT application on PTT mobile unit 140/155 may have access to the capabilities of the mobile computing device that may include but are not limited to a touchscreen, a camera/scanner, and a location determiner (e.g., a Global Positioning System (GPS) determiner), a speech recognizer, or a voice recorder. Information generated from these capabilities such as location information in space and time may be transmitted to other PTT users including PTT mobile unit 155/140, agency server 107/125, and joint agency server 160.

Agency servers 107 and 125 may be implemented on one or more different computing devices having server capabilities. Such a computing device may include, but is not limited to, a device having a processor and memory, including a non-transitory memory, for executing and storing instructions. The memory may tangibly embody data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

In the embodiment of FIG. 1, agency server 107 includes six modules. Each module is described below in turn:

Administrative Module: An administrative module such as Administrative Module 111 includes a data input mechanism and is configured to enable the creation, storage, modification, and/or deletion of PTT user information.

As mentioned earlier, with regards to FIG. 11, each secure community (e.g., agency) or set of secured communities may administer its own directory control authority or directory of members. Thus, each agency or set of agencies has a PTT administrator that validates the identity and authority of each PTT mobile unit user associated with their agency or agencies. The PTT administrator registers PTT applications with PTT mobile units and users. For example, The PTT administrator may use Administrative Module 111 to create, store, modify, and/or delete a unique user ID such as a PTT Application user name and a user password that is assigned to a PTT mobile unit user. The user name and user password may be created by the user and approved by the PTT Administrator, or created by the PTT administrator and assigned to the user. The unique user ID may be relationally associated with a mobile computing device (e.g., a mobile radio unit such as a cellular phone) by reference to a mobile computing device ID including but not limited to at least one of: an electronic serial number (ESN), a MAC address, an equipment serial number, a mobile identification number (MIN), a call sign, an encryption key certificate, or a file installed on the mobile computing device, or other information assigned or associated with the mobile computing device.

Information about a PTT mobile unit user, User Identity and Credentials, includes but is not limited to at least one of: a unique user ID (e.g., user name and user password), an identification photo of the user, an agency employer, a title, a position, a rank, a task group, a department or division, a function, an assignment, a badge number, an employee identification number, an incident access level, a birth date, a gender, skill set, an equipment certification, a professional qualification, an accreditation, a license, an experience, a telephone number, a password (e.g., incident control area password), an email address, a mobile computing device ID, or an availability status.

Administrative Module 111 stores User Identity and Credentials of the PTT mobile unit 140 user in a host directory in an agency database such as Database 109. Additionally, the User Identity and Credentials of each PTT mobile unit user is stored in their respective PTT mobile unit and is called a Mobile ID card.

Recall that secure community membership directory module 1110 includes a set of policies that govern the membership information that is made available (e.g., is published) to secure communities (e.g., agencies) with whom a secure communication is established. As described earlier, the membership information is typically static and limited. In an embodiment, the PTT administrator may use Administrative Module 111 to create a dynamic access permission associated with each PTT mobile unit user. The dynamic access permission includes multi-dimensional and multi-parameter rules based on a set of policies of the agency. When a rule is satisfied, the corresponding dynamic access permission changes in real time. The dynamic access permission determines what information, updates, or changes associated with a User Identity and Credentials, Mobile ID card, or field information (e.g., a location) of a PTT mobile unit user are made available to members of the agencies including users of a joint agency server 160, with whom secure communications are established. The dynamic access permission may change automatically, semi-automatically, or manually (e.g., via a PTT administrator) in real time.

In an embodiment, the dynamic access permission of a PTT mobile unit user may include one or more parameters that include at least one of: a severity of the incident, a viewer's proximity to the PTT mobile unit user, the viewer's proximity to an incident control area, the viewer's presence in the incident control area, the PTT mobile unit user's proximity to the incident control area, or the PTT mobile unit user's presence in the incident control area, and the viewer's information including but not limited to: identity, position, task, job, title, agency affiliation, group affiliation, access privilege status, or common talk group membership. Further, the one or more parameters may be indexed.

In embodiments, the one or more parameters may dynamically change in real time, thus the dynamic access permission(s) change accordingly. Therefore, the information that is made available to other agencies with whom secure communication is established, viewers, or recipients of a User Identity and Credentials, Mobile ID card, and/or field information of a PTT mobile unit user can also dynamically change. A manual change may be made by an agency PTT administrator. An automatic change may be made by logic in software, hardware, or a combination thereof that recognizes when a rule of the dynamic access permission has been satisfied, and makes a change to the dynamic access permission accordingly. A semi-automatic change may be a combination of the manual and automatic change.

In an embodiment, the User Identity and Credential information, Mobile ID card information, and field information about a first PTT mobile unit user that is available to a requesting PTT user depends upon the dynamic access permission of the first PTT mobile unit user that is established by the first PTT mobile unit user's agency. The requesting PTT user may be a PTT mobile unit user or a PTT user utilizing a computing device connected to the internet such as a PTT administrator or a joint agency PTT administrator. Further, the requesting PTT user may not be aware of the degree of the authority bestowed to them based on the dynamic access permission when the request is made to access the first PTT mobile unit user's information. A requesting PTT user may electronically transmit an electronic request to agency server 107 query a host directory in database 109 to obtain data to create a directory of PTT mobile units based on the respective dynamic access permissions. In addition, a requesting PTT user may query the first PTT mobile unit (e.g., Mobile ID card) to obtain data to create a directory of PTT mobile units. In an embodiment, the directory of PTT mobile units may be stored in a local memory of the requesting PTT mobile unit, in an agency database, or a joint agency database of the requesting PTT user. The directory of PTT mobile units may be displayed and selectable on a graphical user interface (GUI) on a touch screen, for example. Further, the directory of PTT mobile units may be automatically synchronized with a host directory when the PTT mobile unit or PTT user makes a request to the agency server associated with the host directory. Thus, a PTT user may automatically receive information associated with a User Identity and Credentials, a Mobile ID card, or field information, associated with the PTT mobile unit user, such as location information of a PTT mobile unit user based on the PTT mobile unit user's dynamic access permission. When a dynamic access permission changes (e.g., a parameter changes and a different rule is satisfied) a PTT user may begin to electronically receive or view additional data such as a location of a PTT mobile unit user in real time. Also, a PTT user may also electronically receive or view less information when a different rule is satisfied.

For example, PTT mobile unit 155 may query a host directory in a database such as database 180, obtain User Identity and Credentials based on the respective dynamic access permissions, and store the User Identity and Credentials in a directory of PTT mobile units in a local memory such as the memory of PTT mobile unit 155. PTT mobile unit 155 user may view PTT mobile unit 140 user's identity and agency affiliation, based on the dynamic access permission associated with PTT mobile unit 140. The directory of PTT mobile units in the memory of a PTT mobile unit 155 may be automatically synchronized with a host directory when PTT mobile unit 155 makes a request to agency server 125 via IP network 135. When PTT mobile unit 155 comes within a given proximity of PTT mobile unit 140 (e.g., a parameter such as the viewer's proximity to PTT mobile unit 140 changes and another rule has been satisfied), the data associated with PTT mobile unit 140 user now available to PTT mobile unit 155 may dynamically change (e.g., increase), and PTT mobile unit 155 user may now view more of PTT mobile unit 140 user's credentials and information such as equipment certifications, emergency medical training, and current location. Because of the additional data that is now visible to PTT mobile unit 155 user, PTT mobile unit 155 user may now electronically transmit a talk group invitation to PTT mobile unit 140 user. When the PTT mobile unit user 155 is no longer in proximity to PTT Mobile Unit 140, a different rule may satisfied and PTT mobile unit 155 user may view less information about PTT mobile unit 140 user.

Talk group module: A talk group module such as talk group module 113 may be configured to create and store talk groups and talk group member identities. A talk group module may be configured to electronically receive a request to create, modify, and delete a talk group. The request may be from the agency's PTT administrator or a PTT mobile unit user associated with the same agency. When a talk group is created, an associated talk group permission rule is established that may indicate the authority of each member. For example, one or more members may be given delegation authority to invite, add or delete members of a talk group. For example, a PTT user such as a dispatch unit may be a delegate of a talk group who is authorized to invite or add members from another land radio network to the talk group. The talk group module creates a talk group, talk group permission rules, assigns the talk group to a radio channel, and sends invitations to PTT users and PTT mobile unit users accordingly to join the talk group.

An invitation (e.g., to a talk group, information channel subscription, or joint incident) may be an audio and/or visual message displayed on a graphical user interface of a PTT mobile unit. In addition, the invitation may be sent via other communications networks or means, including email, short message service (SMS), a voice mail which contains a hyperlink or other executable function, command or prompt that invites the enabled user to accept an invitation.

A talk group module may also be configured to establish an information channel permission rule for automatically creating and electronically transmittingan invitation to subscribe to an information channel associated with the incident control area, where the information channel permission rule is based on at least one of: a talk group membership of a PTT mobile unit user, the dynamic access permission associated with the PTT mobile unit user, the identity of the PTT mobile unit user, a credential of the PTT mobile unit user, a proximity to or a presence in an incident control area of the PTT mobile unit user, or a proximity to or a presence in an incident control area of another PTT mobile unit user. The information channel includes but is not limited to at least one of: weather information, traffic information, bio-hazard alerts, operational status, updates, or other announcements. When the information channel permission rule is satisfied, the talk group module sends the invitation to subscribe to the information channel to the PTT mobile unit user, and may electronically receive an acceptance from the PTT mobile unit user.

In an embodiment, an agency PTT administrator or a PTT mobile unit user with delegation authority (e.g., authority to add/delete members of talk group) may invite users with mobile computing devices (e.g., a smart phone or a land mobile radio device) that are not associated with the agencies that have established a secure communication (e.g., a user whose agency is not a member of an interoperability network), to join a talk group. The invitation may be an email message or an SMS message that contains a hyperlink with access to a client PTT application of the inviting agency. The invitation or a subsequent invitation may invite the user to subscribe to an information channel. If the user accepts the talk group invitation, the user may download the agency's client PTT application to their mobile computing device, enter User Identity & Credentials in an acceptance email, and electronically transmit the acceptance email response to the inviting agency's agency PTT administrator. In an embodiment, several exchanges may take place between the agency PTT administrator and the accepting user to obtain the User Identity & Credentials information which included the associated mobile computing device ID (e.g., radio device identity). The agency PTT administrator may use an administrative module to create, store, modify, and/or delete User Identity & Credentials for the accepting user in the inviting agency's database based on the received information. In an embodiment, the User Identity & Credentials for the accepting user may be stored in a separate database and is relationally coupled to the inviting agency's database. The agency PTT administrator may use a talk group module to add the accepting user to the talk group and/or and add the accepting user to the subscription to electronically receive any subscribed information. Once the accepting user is added to the talk group, the accepting user may electronically transmit communications to and electronically receive communications from the talk group. The accepting user may also electronically receive information as subscribed via the information channel.

For example, Agency A PTT administrator or a PTT mobile unit user of Agency A with delegation authority may electronically transmit an invitation to a mobile computing device whose user is not associated with agencies responding to an incident (e.g., Agency C (not shown) that has a complementary radio system (e.g., a cellular network) or that has a separate land mobile radio system (e.g., an emergency first responder radio network). The invitation may be an email message that includes a hyperlink to a web page that allows the user to download Agency A's client PTT application to their mobile computing device (e.g., smart phone). The user enters required User ID & Credentials information along with any subscription information channel acceptances in an acceptance response sent to Agency A PTT administrator. Once the user is added to the talk group, the user may electronically transmit communications to and electronically receive communications from the talk group as well as electronically receive subscribed information.

Geographical Information System (GIS) Module: In an embodiment, a GIS module is configured to create an incident control area, a geographical demarcation of the incident site that indicates areas of restricted access. An incident access level may be assigned to an incident control area. The incident access level may be used in conjunction with other User Identity Credentials to determine whether a PTT mobile unit user is authorized to enter an incident control area. Incident control area information may be transmitted to the agencies, members of the agencies, and joint agency servers associated with the incident. The assignment of an incident access level for each PTT mobile unit user is determined by an agency PTT administrator and is included in a User Identity and Credential.

Figure 4:
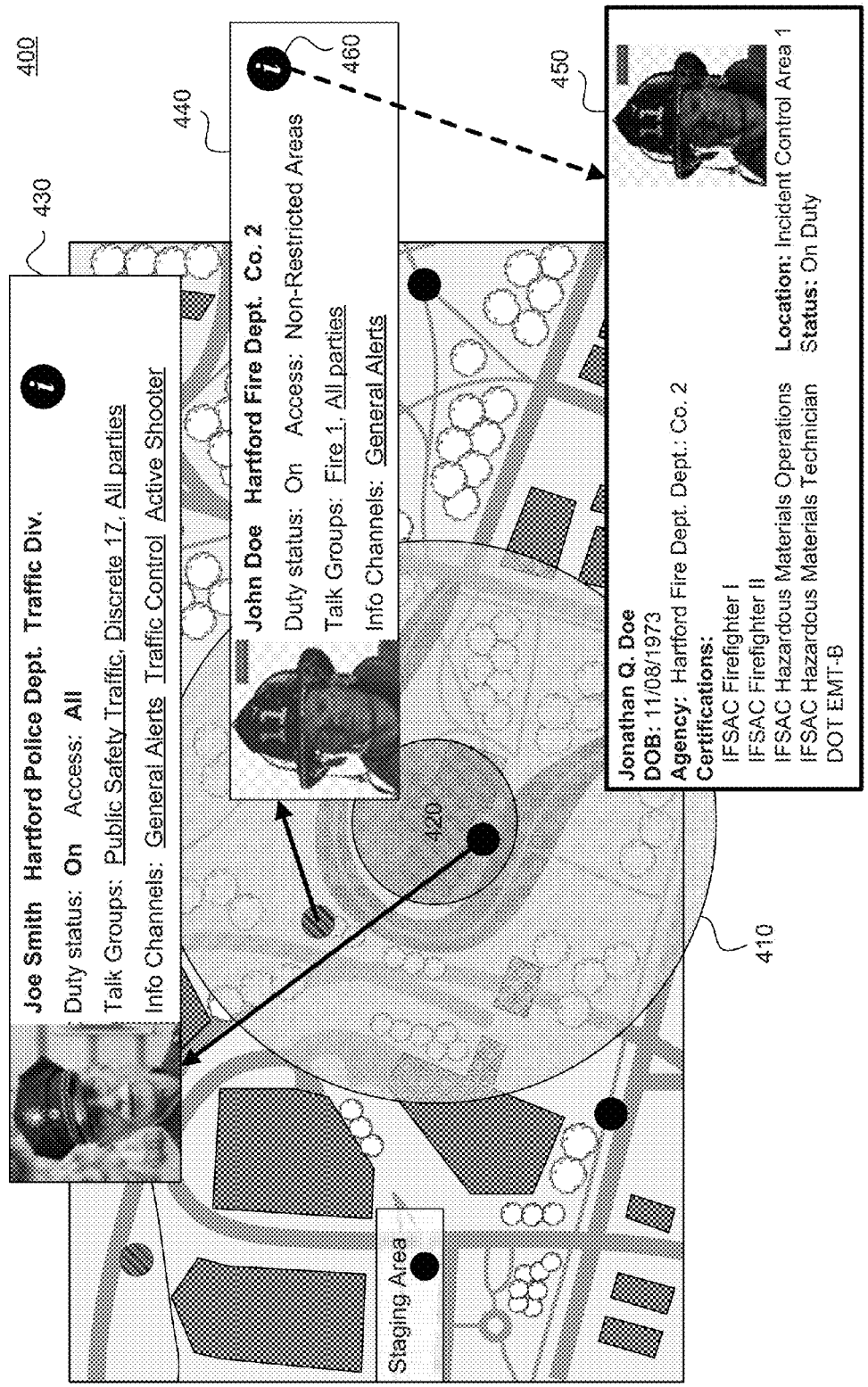
FIG. 4 is a diagram including an incident control area according to an embodiment.

FIG. 4 is a diagram 400 including an incident control area according to an embodiment. Incident control area information may be displayed on a PTT mobile unit or a computing device with at PTT application. Incident control Area 420 may be assigned a restricted incident access level where only PTT mobile unit users with a restricted incident access level or higher (e.g., all or unrestricted incident access level) may be authorized to enter. Incident control Area 410 may be assigned a non-restricted area.

When an incident control area is associated with a talk group, the talk group is called a geotalk group. One or more talk groups may be created and assigned to an incident control area by various agencies responding to the incident creating one or more geotalk groups. A PTT administrator may also use the talk group module to create, store, modify, and/or delete one or more pre-established talk group permission rules to automatically create and electronically transmit an invitation to join a talk group when the one or more talk group permission rules is satisfied. A pre-established talk group permission rule may be established and associated with an incident control area to automatically send invitations to PTT mobile unit users to join a geotalk group. When a PTT mobile unit user is authorized to enter an incident control area and satisfies a pre-established talk group permission rule, an invitation may be automatically generated and sent to the PTT mobile unit user. For example, when PTT mobile unit 140 user is authorized to enter an incident control area and a pre-existing talk group permission rule is satisfied (e.g., PTT mobile unit 140 user is a hazardous materials technician), an invitation may be automatically created and sent to PTT mobile unit 140.

Presence and Check-in Module: In an embodiment, a presence and check-in module such as presence and check-in module 119 is configured to determine whether the PTT mobile unit user is authorized to enter an incident control area based on the PTT mobile unit user's dynamic access permission. The presence and check-in module may be configured to automatically send an audio or visual prompt to the PTT mobile unit user to enter a password or a credential to check-in to the incident control area, and electronically receive the password or the credential from the PTT mobile unit user.

The presence and check-in module may be configured to log, record, store, and retrieve at least one of: recording at least one of: a location of the PTT mobile unit user, a check-in date and time of the PTT mobile unit user entering the incident control area, a check-out date and time of the PTT mobile user departing the incident control area, a message content received by the PTT mobile unit user, a message content transmitted by the PTT mobile unit user, an identifier of the talk group, a descriptor of the incident, or an event criteria. The information may be stored in a local database.

In addition, the presence and check-in module is also configured to track the location of the PTT mobile unit user in real time, where the PTT mobile unit user is represented by a visual icon displayed on a graphical user interface with respect to the PTT mobile unit user's proximity to, or presence in the incident control area. The presence and check-in module is also configured to associate the visual icon with a selectable command for sending, selecting and displaying information associated with the PTT mobile unit user. For example, in FIG. 4, responder Joe Smith is represented by a black circle and responder John Doe is represented by a patterned circle with respect to a map that includes incident control areas. Selecting John Doe's patterned circle on a GUI presents a portion of John Doe's Mobile ID card 440. Further, selecting the information icon 460 on Mobile ID card 440 results in a more details 450 from John Doe's Mobile ID card to be presented. The information presented complies with the dynamic access permission established by the agency with which John Doe is associated, the Hartford Fire Dept.

In an embodiment, the visual icon displayed on the graphical user interface may be associated with a second selectable command (not shown) that allows a push to talk voice message to be sent privately to the PTT mobile unit user that joined the talk group without a remaining member of the talk group hearing the voice message. Thus a private voice message may be sent to Joe Smith that would not be audible to John Doe.

Monitoring Module: In an embodiment, a monitoring module such as Monitoring Module 117 is configured to establish a warning message trigger rule for electronically transmitting a warning message to a PTT mobile unit user and/or one or more other PTT mobile units. The monitoring module may be configured to create, store, modify and associate pre-recorded and/or store-and-forward based warning messages and associate the warning message with a warning message trigger rule. A warning message may also be manually initiated via a dispatch unit who may or may not be a member of a talk group. The warning message may be an audible or a visual message. Further, the warning message may be associated with an identifying sound or visual alarm that may be heard or seen by one or more PTT mobile units in one or more PTT talk groups.

A warning message trigger rule may be based on location based or non-location based triggers, field information values received from a PTT mobile unit, or a combination thereof. For example, the monitoring module may be configured to electronically receive a field information value via a PTT mobile unit associated with the PTT mobile unit user that joined the talk group, where the field information value includes at least one of: an identity; a field information status; a credential; a location; biological sensor monitoring data; detection or presence of a chemical agent or a biological agent; or detection or presence of a radiological material or a nuclear material. The monitoring module compares the field information value received against the warning message trigger rule, and when the warning message trigger rule has been satisfied, sends the associated warning message to the PTT mobile unit user and/or the one or more other PTT mobile units. The monitoring module may electronically transmit the warning message to the one or more other PTT mobile units based on at least one of: common talk group membership, proximity to the PTT mobile unit whose field information triggered the warning message trigger rule, proximity to an incident control area, agency or group affiliation, skill set, a severity of an incident, a type of incident, or other criteria.

When a PTT mobile unit user may be in distress, a PTT mobile unit (e.g., a client PTT application on a mobile computing device) may include a monitoring module configured to detect the distress, and enable distress messages to be sent to other PTT mobile units (e.g., other client PTT applications on respective mobile computing devices) that are members of a common talk group. Further, the PTT mobile unit may electronically transmit distress messages to members of other PTT talk groups based on their criteria including but not limited to: association with the same agency, a certain skill, a professional qualification, a certification, or other credential, a severity of the incident (e.g., level of emergency classification), or a geographic proximity to the distressed PTT mobile unit user. The distress message may be an audio, text or visual message indication.

When a monitoring module of a PTT mobile unit enables a distress signal, the PTT mobile unit may establish a new talk group (e.g., electronically transmit invitations or electronically transmit invitations via the agency PTT administrator). Members of the new talk group may include but are not limited to at least one of: the PTT mobile unit user in distress, other members of preexisting common talk groups (e.g., other members of preexisting talk groups of which the distressed PTT mobile unit user is a member), other members outside the preexisting common talk groups, or those who elect to join the new talk group. In an embodiment, the PTT mobile unit may electronically transmit invitations to the new talk group to members of other PTT talk groups based on their criteria including but not limited to: association with the same agency, a certain skill, a professional qualification, a certification, or other credential, a severity of the incident (e.g., level of emergency classification), or a geographic proximity to the distressed PTT mobile unit user.

A distress message transmission may initiated manually by for example, a PTT mobile unit user selecting an item on the PTT mobile unit device (e.g., a button on a graphical user interface on a smart phone). Alternatively, a distress message transmission may be automatically initiated by an associated sensor or other system measuring and detecting an event when a measurement exceeds a threshold value. For example, a bio-sensor may measure, detect, and automatically send a distress message that indicates an extreme body temperature or blood pressure; an audio sensor may measure, detect, and automatically send a distress message that indicates a gun-shot sound; or an accelerometer sensor may measure, detect, and automatically send a distress message that indicates a sudden acceleration or deceleration. In an embodiment, different levels, classifications or types of distress messages may be associated with a type of incident (e.g., emergency) and/or a severity of the incident.

A monitoring module of a PTT mobile unit may also be configured allow remote control of the PTT mobile unit when a defined event occurs or is detected (e.g., a distress event is detected) or a PTT mobile unit user does not respond to a confirmation message. For example, after the PTT mobile unit sends a distress signal, the PTT mobile unit may electronically receive and respond to messages (e.g., remote control signals) to activate a microphone, a video camera, or other capability of the PTT mobile unit, client PTT application, or other application on the PTT mobile unit to monitor a distressed PTT mobile unit user, or execute functions for an impaired PTT mobile unit user.

In an embodiment, a monitoring module of a PTT mobile unit may also be configured to respond to a confirmation message. For example, an agency server may include an automated confirmation function (e.g., configured by an agency PTT administrator) to generate a periodic confirmation message or series of confirmation messages requesting a response from a PTT mobile unit user to confirm a physical presence (e.g., to confirm that the user is in possession of their PTT mobile unit or to confirm that the user is physically safe (e.g., conscious and responsive in a dangerous environment)). A response may include a voice response, a formatted data signal, an email response, a SMS response, a selection on the PTT mobile unit (e.g., selectable item on a touchscreen of a smart phone) or other message response to confirm a presence. The response may be sent in the clear, encoded or encrypted. In the event a response is not received, a PTT administrator may remotely control the PTT mobile unit including but not limited to: activate and control certain functions (e.g., microphone, camera) described above, disable all or part of the client PTT application, or erase (e.g., clean or wipe) all data from the PTT mobile unit by overwriting, randomizing, encrypting and locking, or revoking an encryption key associated with encrypted stored data.

Interop Gateway Module: An interop gateway module such as Interop Gateway Module 109 may be configured to control a transmission and receipt of a set of voice and data messages from PTT mobile unit users not associated with the agency that established the talk group. That set of voice and data messages are received via an interoperability gateway, and the interop gateway module may route the set of voice and data messages based on an established talk group permission rule.

A joint agency server such as joint agency server 160 may be used by one or more designated commanders from each agency to coordinate activities of responding personnel. Unlike conventional central commands where an agency must relinquish control of its resources to a central commander, a joint agency application server is a multi-agency application server, where each agency determines the dynamic access permission for each of the PTT users in their agency. A user of the joint agency PTT application (e.g., a joint agency administrator) may use a joint agency server to electronically transmit a joint incident invitation or query to one or more PTT administrators of the agencies responding to the incident. The joint incident invitation may be an alert message which is audible and visible on a GUI display of an agency server. The joint incident invitation may be accepted or rejected by a PTT administrator. When a PTT administrator accepts the joint incident invitation, the queried information may be provided based on the agency's dynamic access permission. For example, User Identity and Credentials of PTT mobile unit users may be provided. Subsequently, the joint agency server transmits and receives communications and information from one or more PTT mobile units and dispatch units associated with the agency that accepted the joint incident invitation.

Figure 2:
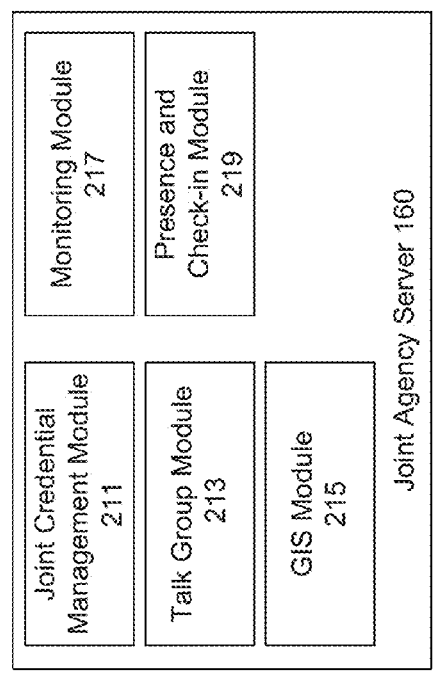
FIG. 2 is a block diagram of a joint agency server according to an embodiment.

FIG. 2 is a block diagram 200 of a joint agency server according to an embodiment. A joint agency server may be a joint agency PTT application hosted by a third party provider or one or more agencies of the agencies responding to the incident (e.g., emergency event, planned or unplanned event, or other common purpose). A joint agency server may be accessed or operated from one or more client computing devices connected via an IP network, and may be coupled to one or more agency server s such as agency server 107 or 120 via IP Network 135. Joint agency server 160 includes talk group module 213, GIS module 215, monitoring module 217, presence and check-in module 219 that perform functions similar to agency server 107 and 125 and are briefly described below.

Joint credential management module 211 generates joint invitations to PTT administrators of the agencies responding to the incident requesting information and permission to access more details regarding an agency's PTT mobile unit user.

Talk group module 213 may establish an information channel permission rule for automatically creating and electronically transmitting an invitation to subscribe to an information channel associated with the incident control area, where the information channel permission rule is based on at least one of: a talk group membership of a first PTT mobile unit user, the dynamic access permission associated with the first PTT mobile unit user, the identity of the first PTT mobile unit user, a credential of the first PTT mobile unit user, a proximity to or a presence in an incident control area of the first PTT mobile unit user, or a proximity to or a presence in an incident control area of another PTT mobile unit user, where the information channel includes at least one of weather information, traffic information, bio-hazard alerts, operational status, updates, or other announcements. When the information channel permission rule is satisfied, talk group module 213 sends the invitation to subscribe to the information channel to the first PTT mobile unit user, and receives an acceptance from the first PTT mobile unit user.

Presence and check-in module 219 of joint agency server 160 may electronically transmit an audio or visual prompt to the first PTT mobile unit user to enter a password or other form of authentication response to check-in to the incident control area; after electronically receiving the password or response from the first PTT mobile unit user, presence and check-in module 219 compares the password or authentication information with data User Identity and Credentials of the first PTT mobile unit user. When the comparing is positive, presence and check-in module 219 approves the check-in of the first PTT mobile unit user. The comparing may include several interrogation and response steps, and may be coupled to or with a secure key exchange.

Presence and check-in module 219 also tracks the location of the first PTT mobile unit user in real time, where the first PTT mobile unit user may be represented by a visual icon displayed on a graphical user interface with respect to a map of the incident control area. The visual icon is associated with a selectable command for selecting and displaying information associated with the first PTT mobile unit user as described above with regards to FIG. 4. In addition, the visual icon displayed on the graphical user interface may be associated with a second selectable command that allows a push to talk voice message to be sent privately to the first PTT mobile unit user without a remaining member of the talk group hearing the voice message.

Monitoring module 217 may establish a warning message trigger rule for electronically transmitting a warning message to the first PTT mobile unit user. Monitoring module 217 may receive a field information value via a PTT mobile unit associated with the first PTT mobile unit user, where the field information value includes at least one of: an identity; a field information status; a credential; a location; biological sensor monitoring data; detection or presence of a chemical agent or a biological agent; or detection or presence of a radiological material or a nuclear material. Monitoring module 217 compares the field information value received with the warning message trigger rule, and when the warning message trigger rule has been satisfied, monitoring module 217 sends the warning message to the first PTT mobile unit user.

GIS module 215 may create incident control areas associated with an incident site to support restricted access.

In another embodiment, joint agency server 160 may log, record, store, and/or delete at least one of the following in database 165: a location of the first PTT mobile unit user, a check-in date and time of the first PTT mobile unit user entering the incident control area, a check-out date and time of the first PTT mobile user departing the incident control area, a message content received by the first PTT mobile unit user, a message content transmitted by the first PTT mobile unit user, an identifier of the talk group, a descriptor of the incident, or an event criteria.

Method

Figure 3:
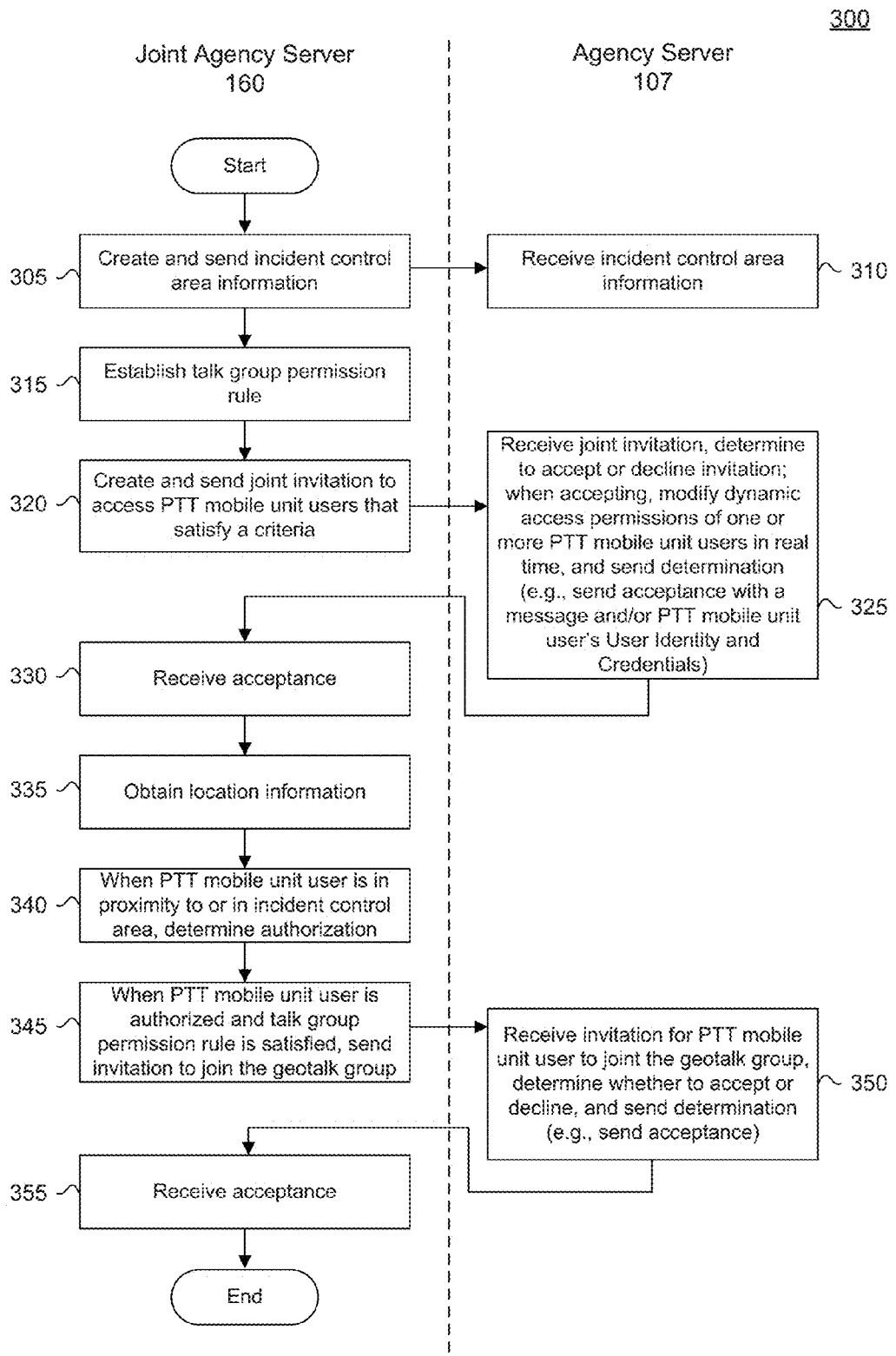
FIG. 3 is a flow chart of a method for intelligently forming and managing dynamic talk groups according to an embodiment.

FIG. 3 is a flow chart of method 300 for intelligently forming and managing dynamic talk groups according to an embodiment. For ease of discussion and without limitation, FIG. 3 will be described with reference to elements from FIG. 1 and FIG. 2.

Method 300 begins and at step 305, joint agency server 160 creates an incident control area associated with a geographic demarcation of the incident area using GIS module 215, and sends information about the incident control area to the two or more agencies.

At step 310, agency server 107 receives the incident control area information. agency server 107 may use this information to establish other geotalk groups (e.g., other talk groups associated with the incident control area).

At step 315, joint agency server 160 establishes a talk group permission rule associated with the incident control area, for automatically creating and electronically transmitting an invitation to PTT mobile unit users who satisfy a criteria, join a geotalk group.

At step 320, joint agency server uses joint credential management module 211 to create and electronically transmit a joint invitation to the two or more agencies for access to PTT mobile unit users that meet a criteria, wherein the joint invitation includes a request for location information.

At step 325, agency server 107 receives the joint invitation and determines whether to accept or decline the invitation. The determination may be automatic, manual, or semi-automatic. When an invitation is accepted, a dynamic access permission of one or more PTT mobile unit users associated with agency server 107 may be modified. In this example, agency server 107 accepts the joint invitation and sends a message accordingly. In an embodiment, agency server 107 may also electronically transmit the User Identity and Credentials of the PTT mobile unit users that satisfy the criteria of the joint invitation to joint agency server 160.

In an embodiment, the dynamic access permission includes one or more parameters including at least one of: a severity of the incident, a viewer's proximity to the first PTT mobile user, a viewer's proximity to the incident control area, a viewer's presence in the incident control area, a proximity of the first PTT mobile unit user to the incident control area, or the a presence of the first PTT mobile unit user in the incident control area, or at least one of a viewer's information: common talk group membership, identity, position, task, job, title, agency or group affiliation, or access privilege status.

At step 330, joint agency server 160 receives an acceptance to the joint invitation that includes a User Identity and Credentials of a first PTT mobile unit user, where a dynamic access permission managed by the first agency determines what information associated with the User Identity and Credentials of the first PTT mobile unit user are available for viewing, and wherein the dynamic access permission may change in real time. In an embodiment, the information associated with the first PTT mobile unit user includes at least one of: an identification photo, an agency employer, a title, a position, a rank, a task group, a department or division, a function, an assignment, a badge number, an employee identification number, an incident access level, a birth date, a gender, a skill set, an equipment certification, a professional qualification, an accreditation, a license, an experience, a telephone number, an email address, a mobile computing device ID, or an availability status. In an embodiment, joint agency server 160 receives automatic updates, changes, and/or information associated with a User Identity and Credentials, a Mobile ID card, or field information, associated with the first PTT mobile unit user based on the dynamic access permission of the first PTT mobile unit user.

At step 335, based on the dynamic access permissions received, joint agency server 160 may obtain a location of the first PTT mobile unit user in real time.

At step 340, when the first PTT mobile unit user is in proximity to the incident control area or is present in the incident control area, joint agency server 160 determines whether the first PTT mobile unit user is authorized to enter the incident control area based on the dynamic access permission.

At step 345, when the first PTT mobile unit user is authorized to enter the incident control area and the talk group permission rule is satisfied, joint agency server 160 sends the invitation to join the geotalk group to the first PTT mobile unit user.

At step 350, agency server 107 receives the invitation for the first PTT mobile unit user to join the geotalk group, and sends an acceptance to the invitation.

At step 355, joint agency server 160 receives the acceptance for the first PTT mobile unit user to join the geotalk group. Method 300 ends.

System Implementation

Figure 5:
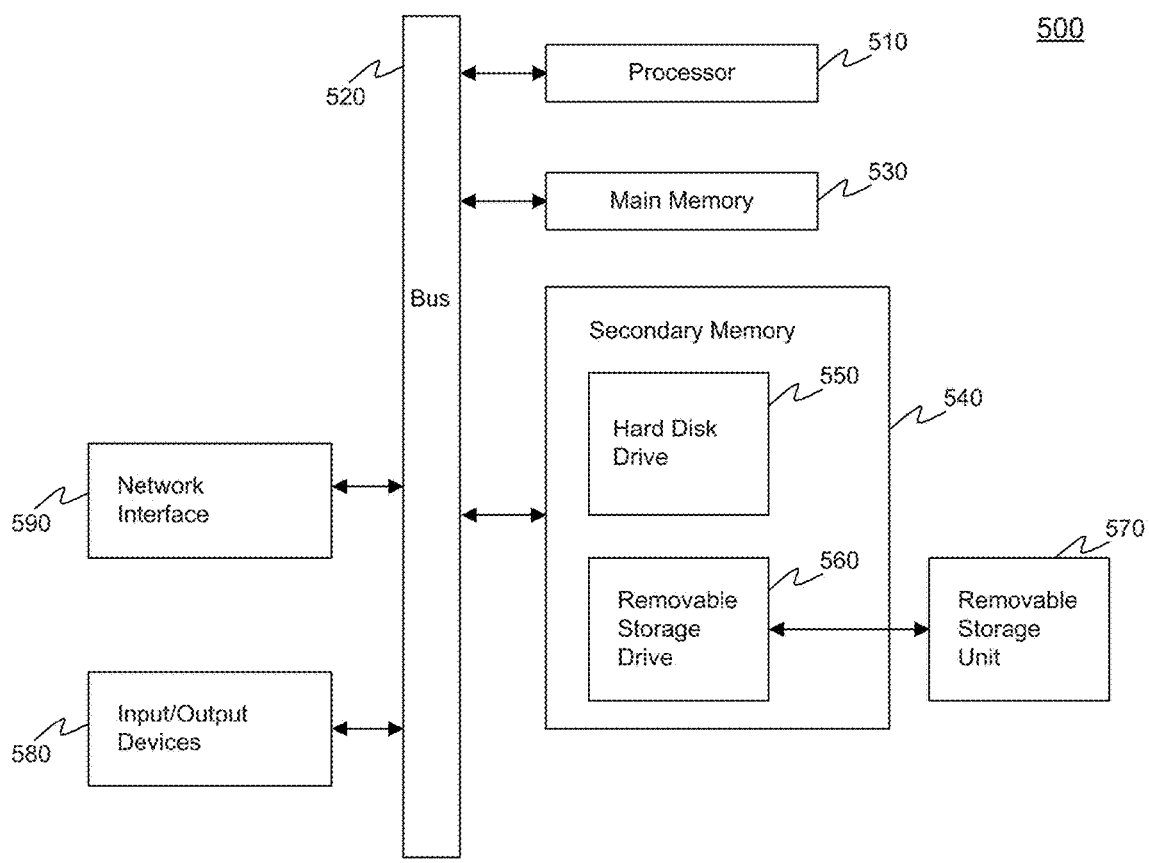
FIG. 5 is an example system useable to implement embodiments.

Various aspects of the invention can be implemented by software, firmware, hardware, or a combination thereof. FIG. 5 illustrates an example system 500 in which the present invention, or portions thereof, can be implemented as computer-readable code and/or text-readable code. After reading this description, it will become apparent to a person skilled in the relevant art how to implement the invention using other systems and/or processing architectures.

Computer 500 includes one or more processors (also called central processing units, or CPUs), such as processor 510. Processor 510 is connected to communication bus 520. Computer 500 also includes a main or primary memory 530, preferably random access memory (RAM). Primary memory 530 has stored therein control logic (computer software), and data.

Computer 500 may also include one or more secondary storage devices 540. Secondary storage devices 540 include, for example, hard disk drive 550 and/or removable storage device or drive 560. Removable storage drive 560 represents a floppy disk drive, a magnetic tape drive, a compact disk drive, an optical storage device, tape backup, ZIP drive, JAZZ drive, etc.

Removable storage drive 560 interacts with removable storage unit 570. As will be appreciated, removable storage unit 560 includes a computer usable or readable storage medium having stored therein computer software (control logic) and/or data. Removable storage drive 560 reads from and/or writes to the removable storage unit 570 in a well-known manner.

Removable storage unit 570, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 500, or multiple computer 500s to perform any combination of the functions described herein.

Computer programs (also called computer control logic) are stored in main memory 530 and/or the secondary storage devices 540. Such computer programs, when executed, direct computer 500 to perform the functions of the present invention as discussed herein. In particular, the computer programs, when executed, enable processor 510 to perform the functions of the present invention. Accordingly, such computer programs represent controllers of the computer 500.

Computer 500 also includes input/output/display devices 580, such as monitors, keyboards, pointing devices, etc.

Computer 500 further includes a communication or network interface 590. Network interface 590 enables computer 500 to communicate with remote devices. For example, network interface 590 allows computer 500 to communicate over communication networks, such as LANs, WANs, the Internet, etc. Network interface 590 may interface with remote sites or networks via wired or wireless connections. Computer 500 receives data and/or computer programs via network interface 590.

CONCLUSION

The invention can be implemented with software, hardware, and operating system implementations other than those described herein. Any software, hardware, and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A method for management of dynamic Push To Talk (PTT) geotalk groups among members of two or more agencies associated with an incident, wherein the two or more agencies communicate securely, wherein an agency includes a collection of communication resources having an administrator, comprising:

creating an incident control area associated with a geographic demarcation of the incident;
electronically transmitting information about the incident control area to the two or more agencies;
establishing a talk group permission rule associated with the incident control area for creating an invitation to join a PTT geotalk group;
electronically transmitting a joint invitation to the two or more agencies for access to PTT mobile unit users that meet a criteria, wherein the joint invitation includes a request for location information;
electronically receiving an acceptance to the joint invitation that includes a User Identity and Credentials of a first PTT mobile unit user, wherein a dynamic access permission managed by a first agency determines what information associated with the User Identity and Credentials of the first PTT mobile unit user is made visible to the two or more agencies, and wherein the dynamic access permission changes in real time;
based on the dynamic access permission, obtaining a location of the first PTT mobile unit user in real time;
determining that the first PTT mobile unit user is authorized to enter the incident control area based on the dynamic access permission;
determining that the talk group permission rule is satisfied based on the dynamic access permission; and
electronically transmitting the invitation to join the PTT geotalk group to the first PTT mobile unit user.

2. The method of claim 1, further comprising:
electronically transmitting an audio or visual prompt to the first PTT mobile unit user to enter a password to check-in to the incident control area; and
electronically receiving the password from the first PTT mobile unit user;
comparing the password with the User Identity and Credentials of the first PTT mobile unit user;
determining that the comparing is positive; and
approving the check-in of the first PTT mobile unit user.

3. The method of claim 1, further comprising:
tracking the location of the first PTT mobile unit user in real time, wherein the first PTT mobile unit user is represented by a visual icon displayed on a graphical user interface with respect to a map of the incident control area; and
associating the visual icon with a selectable command for electronically transmitting, selecting, and displaying information associated with the first PTT mobile unit user.

4. The method of claim 3, wherein the information associated with the first PTT mobile unit user includes at least one of: an identification photo, an agency employer, a title, a position, a rank, a task group, a department or division, a function, an assignment, a badge number, an employee identification number, an incident access level, a birth date, a gender, a skill set, an equipment certification, a professional qualification, an accreditation, a license, an experience, a telephone number, an email address, a mobile computing device ID of the first PTT mobile unit, or an availability status.

5. The method of claim 3, further comprising:
associating the visual icon displayed on the graphical user interface with a second selectable command that allows a PTT voice message to be sent privately to the first PTT mobile unit user without a remaining member of the PTT geotalk group hearing the voice message.

6. The method of claim 1, further comprising:
establishing a warning message trigger rule for electronically transmitting a warning message;
electronically receiving a field information value via a PTT mobile unit associated with the first PTT mobile unit user, wherein the field information value includes at least one of: an identity; a field information status; a credential; a location; biological sensor monitoring data; detection or presence of a chemical agent or a biological agent; or detection or presence of a radiological material or a nuclear material;
comparing the field information value received with the warning message trigger rule;
determining that the warning message trigger rule has been satisfied; and
electronically transmitting the warning message to the first PTT mobile unit user.

7. The method of claim 1, further comprising:
establishing an information channel permission rule for creating an invitation to subscribe to an information channel associated with the incident control area, wherein the information channel permission rule is based on at least one of: a talk group membership of the first PTT mobile unit user, the dynamic access permission associated with the first PTT mobile unit user, the identity of the first PTT mobile unit user, a credential of the first PTT mobile unit user, a proximity to or a presence in an incident control area of the first PTT mobile unit user, or a proximity to or a presence in an incident control area of another PTT mobile unit user, wherein the information channel includes at least one of weather information, traffic information, bio-hazard alerts, operational status, updates, or other announcements;
determining that the information channel permission rule is satisfied;
electronically transmitting the invitation to subscribe to the information channel to the first PTT mobile unit user; and
electronically receiving an acceptance from the first PTT mobile unit user.

8. The method of claim 1, further comprising:
electronically receiving updates, changes, and/or information associated with a User Identity and Credentials, a Mobile ID card, or field information, associated with the first PTT mobile unit user based on the dynamic access permission of the first PTT mobile unit user.

9. The method of claim 1, further comprising:
recording at least one of: the location of the first PTT mobile unit user, a check-in date and time of the first PTT mobile unit user entering the incident control area, a check-out date and time of the first PTT mobile user departing the incident control area, a message content received by the first PTT mobile unit user, a message content transmitted by the first PTT mobile unit user, an identifier of the PTT geotalk group, a descriptor of the incident, or an event criteria.

10. The method of claim 1, wherein the dynamic access permission includes one or more parameters including at least one of: a severity of the incident, a viewer's proximity to the first PTT mobile user, a viewer's proximity to the incident control area, a viewer's presence in the incident control area, a proximity of the first PTT mobile unit user to the incident control area, or a presence of the first PTT mobile unit user in the incident control area, or at least one of a viewer's information: common talk group membership, identity, position, task, job, title, agency or group affiliation, or access privilege status.

11. A system for management of dynamic Push To Talk (PTT) geotalk groups among members of two or more agencies associated with an incident, wherein the two or more agencies communicate securely, wherein an agency includes a collection of communication resources having an administrator, comprising:
one or more processors; and
a memory coupled to the one or more processors, wherein the one or more processors are configured to:
create an incident control area associated with a geographic demarcation of the incident;
electronically transmit information about the incident control area to the two or more agencies;
establish a talk group permission rule associated with the incident control area, for creating an invitation to join a PTT geotalk group;
electronically transmit a joint invitation to the two or more agencies for access to PTT mobile unit users that meet a criteria, wherein the joint invitation includes a request for location information;
electronically receive an acceptance to the joint invitation that includes a User Identity and Credentials of a first PTT mobile unit user, wherein a dynamic access permission managed by a first agency determines what information associated with the User Identity and Credentials of the first PTT mobile unit user is made visible to the two or more agencies, and wherein the dynamic access permission changes in real time;
based on the dynamic access permission, obtain a location of the first PTT mobile unit user in real time;
determine that the first PTT mobile unit user is authorized to enter the incident control area based on the dynamic access permission;
determine that the talk group permission rule is satisfied based on the dynamic access permission; and
electronically transmit the invitation to join the PTT geotalk group to the first PTT mobile unit user.

12. The system of claim 11, the one or more processors further configured to:
electronically transmit an audio or visual prompt to the first PTT mobile unit user to enter a password to check-in to the incident control area; and
electronically receive the password from the first PTT mobile unit user;
compare the password with the User Identity and Credentials of the first PTT mobile unit user;
determine that the comparing is positive; and
approve the check-in of the first PTT mobile unit user.

13. The system of claim 11, the one or more processors further configured to:
track the location of the first PTT mobile unit user in real time, wherein the first PTT mobile unit user is represented by a visual icon displayed on a graphical user interface with respect to a map of the incident control area; and
associate the visual icon with a selectable command for electronically transmitting, selecting, and displaying information associated with the first PTT mobile unit user.

14. The system of claim 13, wherein the information associated with the first PTT mobile unit user includes at least one of: an identification photo, an agency employer, a title, a position, a rank, a task group, a department or division, a function, a assignment, a badge number, an employee identification number, an incident access level, a birth date, a gender, a skill set, an equipment certification, a professional qualification, an accreditation, a license, an experience, a telephone number, an email address, a mobile computing device ID of the first PTT mobile unit, or an availability status.

15. The system of claim 13, the one or more processors further configured to:
associate the visual icon displayed on the graphical user interface with a second selectable command that allows a PTT voice message to be sent privately to the first PTT mobile unit user without a remaining member of the PTT geotalk group hearing the voice message.

16. The system of claim 11, the one or more processors further configured to:
establish a warning message trigger rule for electronically transmitting a warning message;
electronically receive a field information value via a PTT mobile unit associated with the first PTT mobile unit user, wherein the field information value includes at least one of: an identity; a field information status; a credential; a location; biological sensor monitoring data; detection or presence of a chemical agent or a biological agent; or detection or presence of a radiological material or a nuclear material;
compare the field information value received with the warning message trigger rule;
determine that the warning message trigger rule has been satisfied; and
electronically transmit the warning message to the first PTT mobile unit user.

17. The system of claim 11, the one or more processors further configured to:
establish an information channel permission rule for creating an invitation to subscribe to an information channel associated with the incident control area, wherein the information channel permission rule is based on at least one of: a talk group membership of the first PTT mobile unit user, the dynamic access permission associated with the first PTT mobile unit user, the identity of the first PTT mobile unit user, a credential of the first PTT mobile unit user, a proximity to or a presence in an incident control area of the first PTT mobile unit user, or a proximity to or a presence in an incident control area of another PTT mobile unit user, wherein the information channel includes at least one of weather information, traffic information, bio-hazard alerts, operational status, updates, or other announcements;
determine that the information channel permission rule is satisfied;
electronically transmit the invitation to subscribe to the information channel to the first PTT mobile unit user; and
electronically receive an acceptance from the first PTT mobile unit user.

18. The system of claim 11, the one or more processors further configured to:
electronically receive updates, changes, and/or information associated with a User Identity and Credentials, a Mobile ID card, or field information, associated with the first PTT mobile unit user based on the dynamic access permission of the first PTT mobile unit user.

19. The system of claim 11, the one or more processors further configured to:
record at least one of: the location of the first PTT mobile unit user, a check-in date and time of the first PTT mobile unit user entering the incident control area, a check-out date and time of the first PTT mobile user departing the incident control area, a message content received by the first PTT mobile unit user, a message content transmitted by the first PTT mobile unit user, an identifier of the PTT geotalk group, a descriptor of the incident, or an event criteria.

20. The system of claim 11, wherein the dynamic access permission includes one or more parameters including at least one of: a severity of the incident, a viewer's proximity to the first PTT mobile user, a viewer's proximity to the incident control area, a viewer's presence in the incident control area, a proximity of the first PTT mobile unit user to the incident control area, or a presence of the first PTT mobile unit user in the incident control area, or at least one of a viewer's information: common talk group membership, identity, position, task, job, title, agency or group affiliation, or access privilege status.

* * * * *